United States Patent [19]

Niho

[11] Patent Number: 4,999,635
[45] Date of Patent: Mar. 12, 1991

[54] PHASE DIFFERENCE AUTO FOCUSING FOR SYNTHETIC APERTURE RADAR IMAGING

[75] Inventor: Yoji G. Niho, Rancho Palos Verdes, Calif.

[73] Assignee: Hughes Aircraft Company, Los Angeles, Calif.

[21] Appl. No.: 502,000

[22] Filed: Mar. 29, 1990

[51] Int. Cl.⁵ ............................................... G01S 13/90
[52] U.S. Cl. ........................................................ 342/25
[58] Field of Search ............................................ 342/25

[56] References Cited

U.S. PATENT DOCUMENTS

| | | | |
|---|---|---|---|
| H471 | 2/1990 | Powell et al. | 342/25 |
| 4,219,811 | 8/1980 | Herman et al. | 341/25 |
| 4,339,752 | 7/1982 | Williams et al. | 342/25 |
| 4,594,593 | 6/1986 | Nohmi | 342/25 |
| 4,724,418 | 2/1988 | Weindling | 342/25 |
| 4,771,287 | 9/1988 | Mims | 342/25 |

Primary Examiner—Gilberto Barron, Jr.
Attorney, Agent, or Firm—Leonard A. Alkov; W. K. Denson-Low

[57] ABSTRACT

The present invention discloses an autofocusing method and apparatus for Synthetic Aperture Radar which employs operation on two or three subarrays of the SAR compressed data to estimate quadratic and cubic phase errors in the data. Focusing of the SAR array may then be accomplished by removing the estimated phase error from the data to sharpen the image. Phase error is estimated by FFT filtering product arrays formed by multiplying the complex conjugate of one subarray by another of the subarrays to form a correlation function. The correlation functions are integrated. A peak detection of the integrated correlation functions yields a peak location in the filter which is proportional to the phase error which may then be calculated.

10 Claims, 4 Drawing Sheets

PHASE DIFFERENCE AUTO FOCUSING FOR SYNTHETIC APERTURE RADAR IMAGING

BACKGROUND OF THE INVENTION

1. Field of the Invention

The present invention relates generally to the field of focusing of images for ultra high resolution synthetic aperture radar. Specifically, the invention provides a system and method for automatic estimation and correction of quadratic and cubic phase errors from range compressed synthetic aperture radar data to allow focus correction of the image.

2. Prior Art

High resolution synthetic aperture radar (SAR) is used for detailed ground mapping at long range. The data array for the SAR image which has been motion compensated to produce the focused image may still contain residual phase errors which result in an unfocused or smeared image. A number of effects may create this error, such as turbulence, errors in the velocity or inertial platform data from the aircraft, and variations in the height of ground features. However, the dominant source of error is an erroneously sensed motion of the aircraft caused by the inherent limitation of the inertial navigation system.

An automatic estimation and compensation of the phase error has classically been obtained using several techniques. The residual phase error is assumed representable in terms of a second or higher order polynomial and each auto focus technique attempts to estimate the coefficients of the assumed polynomial function. This phase error estimation usually involves partitioning the SAR array into several subarrays. One example is the phase comparison method found in U.S. Pat. No. 4,219,811 to Herman, et al. The Herman technique creates a vector resultant from each of three subarrays formed from the SAR array. A phase correction term is derived by comparing the phase angle of the first end subarray vector resultant with respect to the other end subarray vector resultant bisecting the angle of the two resultants and comparing it with the phase of the central subarray resultant.

Another example is the map drift auto focus method as discussed by C. E. Mancill and J. M. Swiger, published in the 27th *Tri-service Radar Symposium Records*, June 1981. In this method, multiple lower resolution images are produced from subarrays formed from the SAR array. The lower resolution images are then correlated to determine the relative shift. A set of relative shifts or "drifts" among images formed from subarrays are then processed to yield the coefficients of the assumed polynomial.

The phase comparison method is rarely used today, but it can perform a quadratic phase correction and has a pull-in range of approximately ±180 degrees. The map drift method has a very large pull-in range and is often used to estimate higher order phase errors in addition to a quadratic phase error. Focus correction provided by either method described will significantly improve the SAR image, provided that the underlying phase error can accurately be represented by a polynomial.

In the map drift autofocus method, images are formed from the subarrays and are pairwise-correlated to form correlation functions. The accurate determination of the underlying phase error is highly dependent on the presence of a clearly defined peak in the correlation function. The correlation function is, however, sensitive to the SAR scene being processed. If highly distinguishable targets such as man-made targets are present in the scene, the magnitude of the peak in the correlation function is pronounced and phase errors may be accurately estimated on that clearly defined peak. If, however, a SAR scene contains background clutter returns and man-made targets are absent, the correlation function is significantly flattened. As a result, the location of the peak cannot be accurately determined and the phase correction will be in error.

In addition, if the correlation function formed is of a biased type and the SAR scene does not contain man-made targets, a DC filter response can dominate all other correlation values, masking the "real" peak. If a false peak is detected, it will result in erroneous phase corrections.

Another shortcoming of the map drift autofocus method is its vulnerability to the presence of excessive residual phase errors. When subarrays are formed from a full array, a quadratic phase error is reduced quadratically. However, if the original full array has an extremely large amount of quadratic phase error, errors over subarrays may be still large enough to cause excessive defocusing in the resulting images, thus causing a peak of the correlation function to flatten. The map drift method must normally circumvent this shortcoming by performing an iterative focus.

SUMMARY OF THE INVENTION

The present invention eliminates the shortcomings of the prior art to provide a sharp response for phase error determination, even in the scene with a large amount of a quadratic phase error, and the non-busy case with few or no man-made targets.

For a quadratic phase error estimation, two subarrays are formed. Each of the subarrays is a subset of the stored data comprising the range compressed SAR array. The first subarray consists of the first half of the "full" array, and the second subarray consists of the second half. A product array is obtained by multiplying the conjugate of the first subarray with the second subarray. Adaptive scaling that had been applied during range compression is compensated, sidelobe suppression weights are applied, and alternating sign is imposed on successive elements of the product array to center the subsequent FFT filter outputs about the FFT filter bank.

The product array is extended with zeros to provide an array size based on a selected FFT size. An FFT is then performed on the zero filled product array. The magnitude of each FFT filter is then calculated to form a correlation function. This process of forming the product array from two subarrays, performing an FFT, and computing magnitude-detected FFT filters to form a correlation function is repeated for each range bin of the range compressed SAR data. As the correlation functions are formed, they are integrated over the total number of range bins.

After integrating the correlation functions over range bins, the peak is detected and its location is determined. Interpolation is performed to accurately estimate the location of the peak. The center-to-end quadratic phase error is then calculated by multiplying the peak location by a constant $M^2/(4LK)$ where $(2M+1)$ represents the number of azimuth lines in the SAR array, L is the distance between the subarray center and the full array center in terms of the number of azimuth lines, and K equals the size of the FFT.

For simultaneous estimation of a quadratic and a cubic phase errors, three subarrays are formed. First two subarrays are formed exactly in the same manner described previously for the estimation of only the quadratic phase error. The third subarray is formed from a central part of the full array.

A product array is obtained by multiplying the conjugate of the first subarray with the third subarray. Adaptive scaling is compensated, sidelobe suppression weights are applied, and alternating sign is imposed on successive elements of the product array to center the FFT filter output. Similarly, a second product array is obtained by multiplying the conjugate of the third subarray by the second subarray with similar application of adaptive scaling compensation, sidelobe suppression weights and alternating sign.

Each product array is extended with zeros to provide an array size based on selected FFT size. An FFT is then performed. The FFT filters are then magnitude-detected to form a correlation function. As an option, the correlation function may be normalized by the sum of the magnitudes of the input data into the FFT.

For each range bin of the range compressed SAR data, this process is repeated for both product arrays. As the correlation functions are formed, they are integrated over range bins. After integrating the correlation functions over all range bins, a peak is detected and its location is determined for both correlation functions. Interpolation is performed to accurately estimate the location of the peak.

The center-to-end quadratic phase error is calculated by multiplying the sum of the peak location for the first product array and the peak location for the second product array by a constant $M^2/(4LK)$ while the center-to-end cubic phase error is calculated by the negative of the difference of the peak location for the first product array minus the peak location for the second product array multiplied by a constant $M^3/(6L^2K)$.

DETAILED DESCRIPTION

Figure 1:
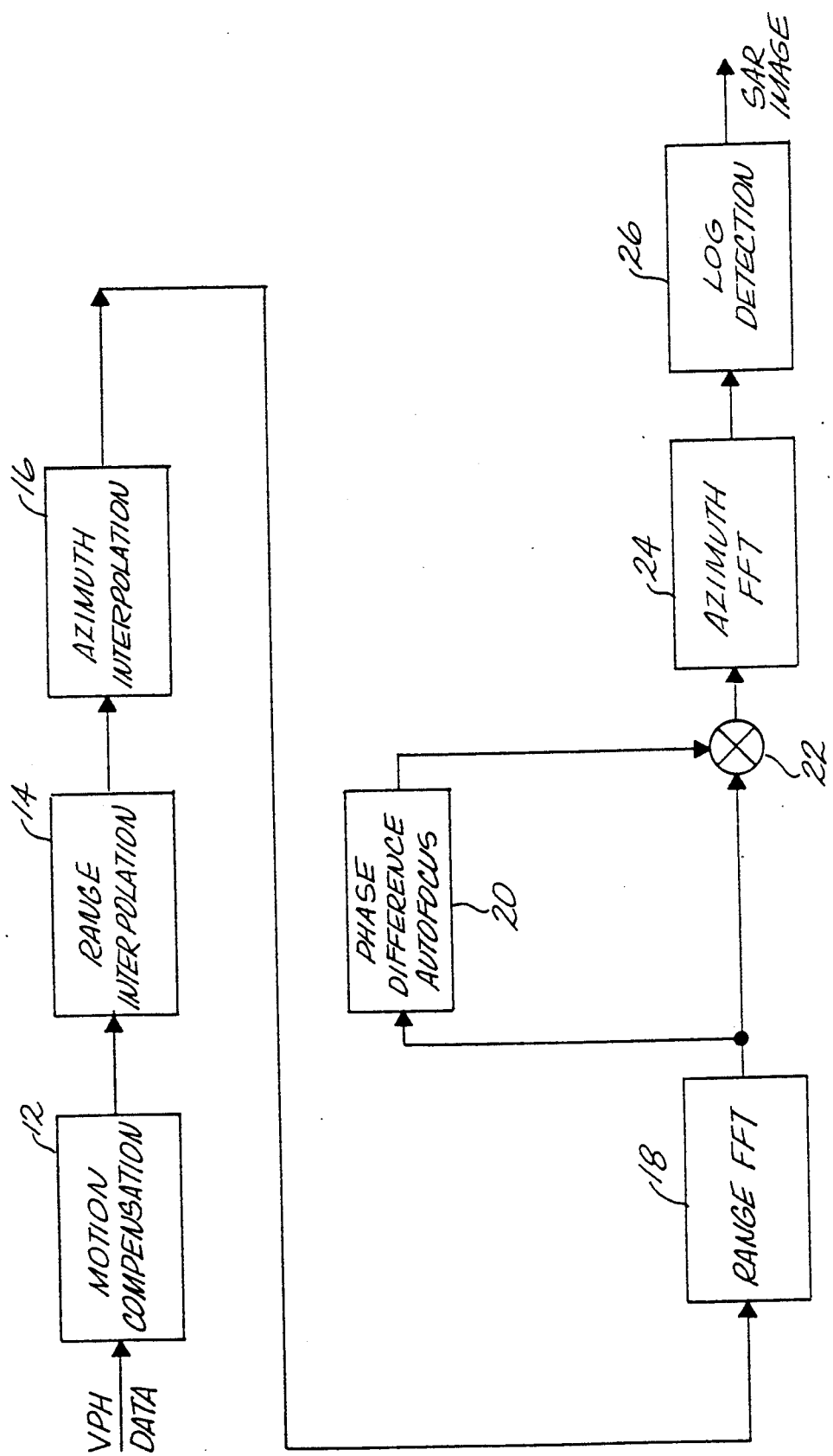
FIG. 1 is block diagram schematic of an SAR image generation system incorporating the invention.

The invention can be understood by examining the phase variation over one synthetic array of length T. If we denote the phase variation as $\phi(t)$ over an interval $-T/2 \leq t \leq T/2$, the array center is at time $t = 0$. If we then assume that an odd number of data points are uniformly sampled over the interval T, we can designate the array length as $2*M + 1$. The full array may then be denoted by $s(m) = \sigma e^{j\phi(m)}$ for the interval $-M \leq m \leq M$ where $\phi$ denotes the magnitude and $\phi(m)$ the phase. The phase variation can be considered of the form $\phi(m) = 2\pi(A + Bm + Cm^2)$ where A, B, and C are unknown constants. The center-to-end quadratic phase error is then $2\pi CM^2$ and may be characterized by the quadratic coefficient C.

To determine the coefficient C, two subarrays are formed $x(n)$ and $y(n)$ of length $2N + 1$ with the centers of the subarrays located at $m = -L$ and $m = L$ respectively. The two subarrays may be overlapped. The two subarrays are then of the form $x(n) = s(n - L) = \phi e^{j\phi(n-L)}$ and $y(n) = s(n + L) = \sigma e^{j\phi(n+L)}$ for the interval $-N \leq n \leq N$. The phase variation over the first subarray may then be written $$\phi(n-L) = 2\pi[A + B(n-L) + C(n-L)^2].$$

Similarly, the phase variation over the second subarray can be written as $$\phi(n+L) = 2\pi[A + B(n+L) + C(n+L)^2].$$

A product array formed by multiplying the complex conjugate of the first subarray with the second subarray yields the result $$r(n) = x^*(n)y(n) = \sigma^2 e^{-j\phi(n-L)} e^{j\phi(n+L)}.$$

Expanding the equations for the phase variation, $$r(n) = \sigma^2 e^{+j2\pi(2BL+4CLn)}.$$

The value of C may be determined by performing a Fast Fourier Transform (FFT) on the product array r(n). For a K-point FFT, the k-th filter is given by $$R(k) = \sigma^2 \Sigma \{e^{-j2\pi kn/K} r(n)\} \text{ for } n = 0 \text{ to } 2N.$$

Inserting r(n), combining and expanding, $$R(k) = \sigma^2 e^{j4\pi BL} \Sigma \{e^{-j2\pi(k/K-4CL)n}\} \text{ for } n = 0 \text{ to } 2N$$

or by changing form $$R(k) = \sigma^2 e^{j4\pi BL} e^{-j\pi 2N(k/K-4CL)} \sin[\pi(k/K-4CL)(2N+1)]/\sin[\pi(k/K-4CL)].$$

The peak response for the filters will be located at $k = 4CLK$, which is defined to be $\tau_{xy}$. The filter location $\tau_{xy}$ can be estimated within a fraction of a filter spacing by simply interpolating between the filters having the maximum responses. Consequently, the value C is then given by $C = \tau_{xy}/4LK$ and the center-to-end quadratic phase error $\phi_q$ is given by $\phi_q = 2\pi CM^2 = 2\pi \tau_{xy} M^2/4LK$.

The previous derivation is based on only one dominant return present in the SAR array. A similar analysis may be conducted for multiple targets. If two targets are assumed, the analysis demonstrates that three peaks are produced by the FFT, including the main response at $\tau_{xy} = 4CLK$, and paired-echo responses. In certain circumstances, the paired-echo responses may result in a cancellation of a main response. However, the location of the main response is always at $\tau_{xy} = 4CLK$ while locations of the paired-echo response may vary. The volume and randomness of radar video data tend to spread the paired-echo responses over all filters while producing a dominant peak response at $\tau_{xy} = 4CLK$.

The previous analysis for quadratic phase error may be extended to estimate higher order phase errors. The cubic phase error may be determined by representing the phase variation in the form $\phi(m) = 2\pi(A + Bm + Cm^2 + Dm^3)$ for the interval $-M \leq m \leq M$, where A, B, C and D are unknown constants. The quadratic phase error $2\pi CM^2$ and the cubic phase error $2\pi DM^3$ or equivalently the coefficients C and D may be calculated. For the full array s(m) of length 2M + 1, three subarrays are formed; x(n), y(n) and z(n) of length 2N + 1 with subarray centers located at $m = -L$, $m = L$, and $m = 0$, respectively. The equations describing the subarrays x(n) and y(n) are as previously described, and $$z(n) = s(n) = \sigma e^{j\phi(n)}$$

for the interval $-N \leq n \leq N$.

Product arrays are again obtained as follows:

$$r_{xz}(n) = x^*(n)z(n) = \sigma^2 e^{-j\phi(n-L)}e^{j\phi(n)}$$
$$= \sigma^2 e^{+j2\pi(2CL-3DL^2)n}e^{j6\pi DLn^2}$$

and $$r_{zy}(n) = z^*(n)y(n) = \sigma^2 e^{-j\phi(n)}e^{j\phi(n+L)}$$
$$= \sigma^2 e^{+j2\pi(2CL+3DL^2)n}e^{j6\pi DLn^2}$$

In the above expression, the constant terms are disregarded since they do not affect the location or the shape of the peak response.

Employing a K-point FFT on the product arrays as previously described, the peak response will be located at $$\tau_{xz} = (2CL - 3DL^2)K \text{ and } \tau_{zy} = (2CL + 3DL^3)K.$$

Solving equations simultaneously for C and D,
$$C = (\tau_{xz} + \tau_{zy})/4LK$$

and $$D = (\tau_{zy} - \tau_{xz})/6L^2K.$$

The center-to-end quadratic phase error $\phi q$ is then given by $$\phi q = 2\pi CM^2 = 2\pi(\tau_{xz} + \tau_{zy})M^2/4LK$$

and the center-to-end quadratic phase error $\phi c$ is given by $$\phi_c = 2\pi DM^3 = 2\pi(\tau_{zy} + \tau_{xz})M^3/6L^2K.$$

In the above analysis polynomials have been represented as Taylor series. The preferred approach in characterizing the phase function is a representation in terms of Legendre polynomials. The above analysis, while simplified by the use of the Taylor series is equally applicable to a Legendre polynomial representation.

Turning now to the drawings, FIG. 1 shows the signal flow for the SAR data incorporating the phase difference autofocus of the present invention. Video phase history (VPH) data is operated on for motion compensation 12, range interpolation 14, azimuth interpolation 16, and a range FFT 18 or range compression. The range compressed data is acted on by the phase difference autofocus 20 of the present invention which calculates the phase error. The phase error is then extracted from the data through multiplier 22 as will be described in greater detail subsequently. The data is then operated on for an azimuth FFT 24 or azimuth compression prior to log detection 26 to provide the SAR image.

Figure 2:
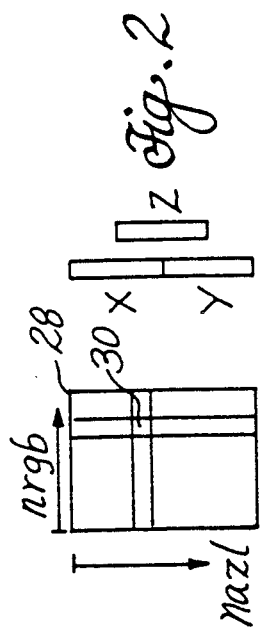
FIG. 2 is a pictorial representation of the range compressed SAR array and the subarrays formed as a portion of the present invention.

The range compressed data is contained in an array of azimuth lines and range bins as shown in FIG. 2. The array 28 of the range compressed data consists of nrgb range bins and nazl azimuth lines. The intersection of each range bin and azimuth line provides a time sample 30 for that range bin.

For a quadratic phase error estimation, two or more subarrays are needed. For simultaneous estimation of both a quadratic and a cubic phase errors, three or more subarrays are required. In the present invention, two subarrays x and y are formed for a quadratic only case. For a quadratic and cubic case, three subarrays x, y, and z are formed. Subarray x consists of a first half of the time samples in each range bin, and subarray y a second half. Subarray z consists of a center half of the time samples in each range bin. No overlap is assumed between subarrays x and y. However, as previously described, subarrays x and y may be overlapped if desired.

Figure 3:
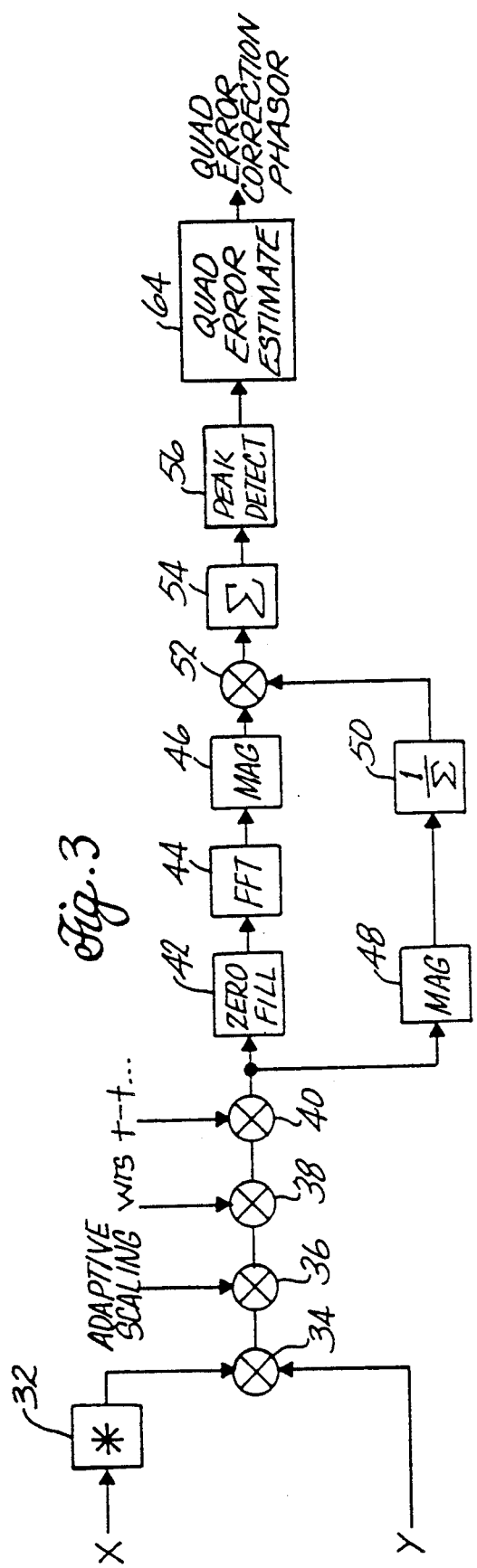
FIG. 3 is a detailed block diagram schematic demonstrating the individual elements of the invention for a quadratic phase error estimation.

FIG. 3 shows the elements of the invention for determining the quadratic phase error correction phaser. Subarray x is acted on by a conjugation means 32 and combined with subarray y through multiplier 34 resulting in a product array. Adaptive scaling compensation and FFT weights are introduced into the product array through multipliers 36 and 38 respectively. Adaptive scaling compensation is performed to remove the effect of the adaptive scaling of the data during range compression. The FFT weights are applied to suppress sidelobe responses. These amplitude weighting functions are normally real and symmetric and therefore do not change the location of the peak response. Alternating positive and negative sign is introduced into the product array through multiplier 40 to center the DC response in the FFT filter bank. A zero fill 42 is accomplished on the array to match the array to a filter bank size and the array is then operated on by the FFT 44. The FFT filters are then magnitude-detected 46 to form a correlation function. The resulting correlation function may be normalized by performing magnitude-detect 48 on the inputs to the FFT, taking the inverse of the sum of the magnitude detects 50, and multiplying the result through the multiplier 52. The output of multiplier 52, the normalized or unnormalized correlation function, is then integrated over the range bins in summer 54. This integrated "array" is a correlation function which allows determination of the phase error based on the location of the maximum value of the function. A peak detect 56 is then accomplished. As previously described, the peak filter location $\tau_{xy}$ is determined within a fraction of a filter spacing by interpolating between filters having the maximum responses. The peak location $\tau_{xy}$ is then used to estimate the center-to-end quadratic phase error 64, which in turn is used to produce a phase correction phaser to multiplier 22 of FIG. 1 for compensation of a residual quadratic phase error in the range compressed SAR data.

Figure 4:
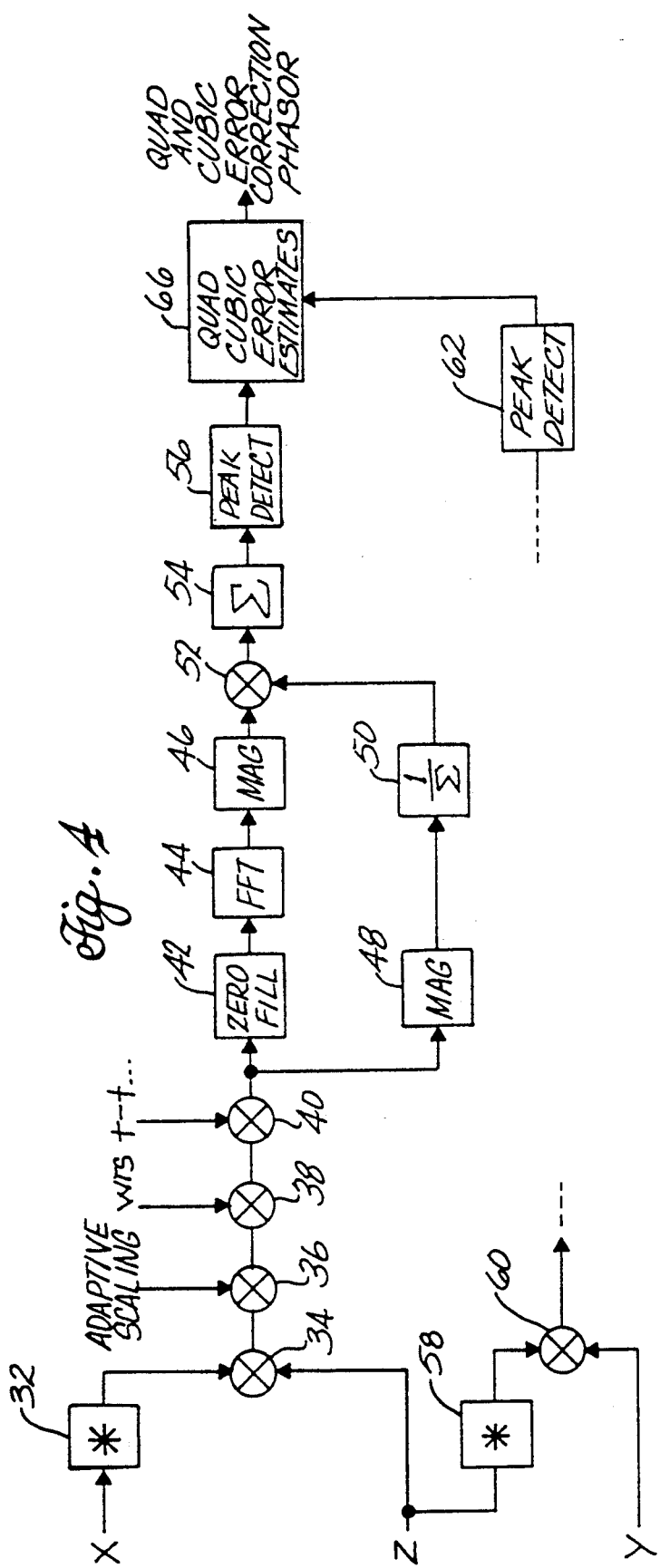
FIG. 4 is a detailed block diagram schematic demonstrating the individual elements of the invention for a simultaneous estimation of a quadratic and a cubic phase errors.

FIG. 4 shows the elements of the invention for a simultaneous estimation of a quadratic and a cubic phase errors. As shown in the FIGURE, three subarrays x, y, and z, are processed. Processing of subarrays x and z for this case is identical to processing of subarrays x and y for the quadratic estimation case (FIG. 3)

except that the location of the maximum response is now called $\tau_{xz}$. Similarly, processing of subarrays z and y is identical to processing of subarrays x and y in the quadratic estimation case (FIG. 3) except that the location of the peak response is now called $\tau_{zy}$. $\tau_{xz}$ and $\tau_{zy}$ are then input to the quadratic and cubic phase error estimator 66, which in turn is used to produce a phase correction phaser to multiplier 22 of FIG. 1 for compensation of a residual quadratic and cubic phase errors in the range compressed SAR data.

Figure 5:
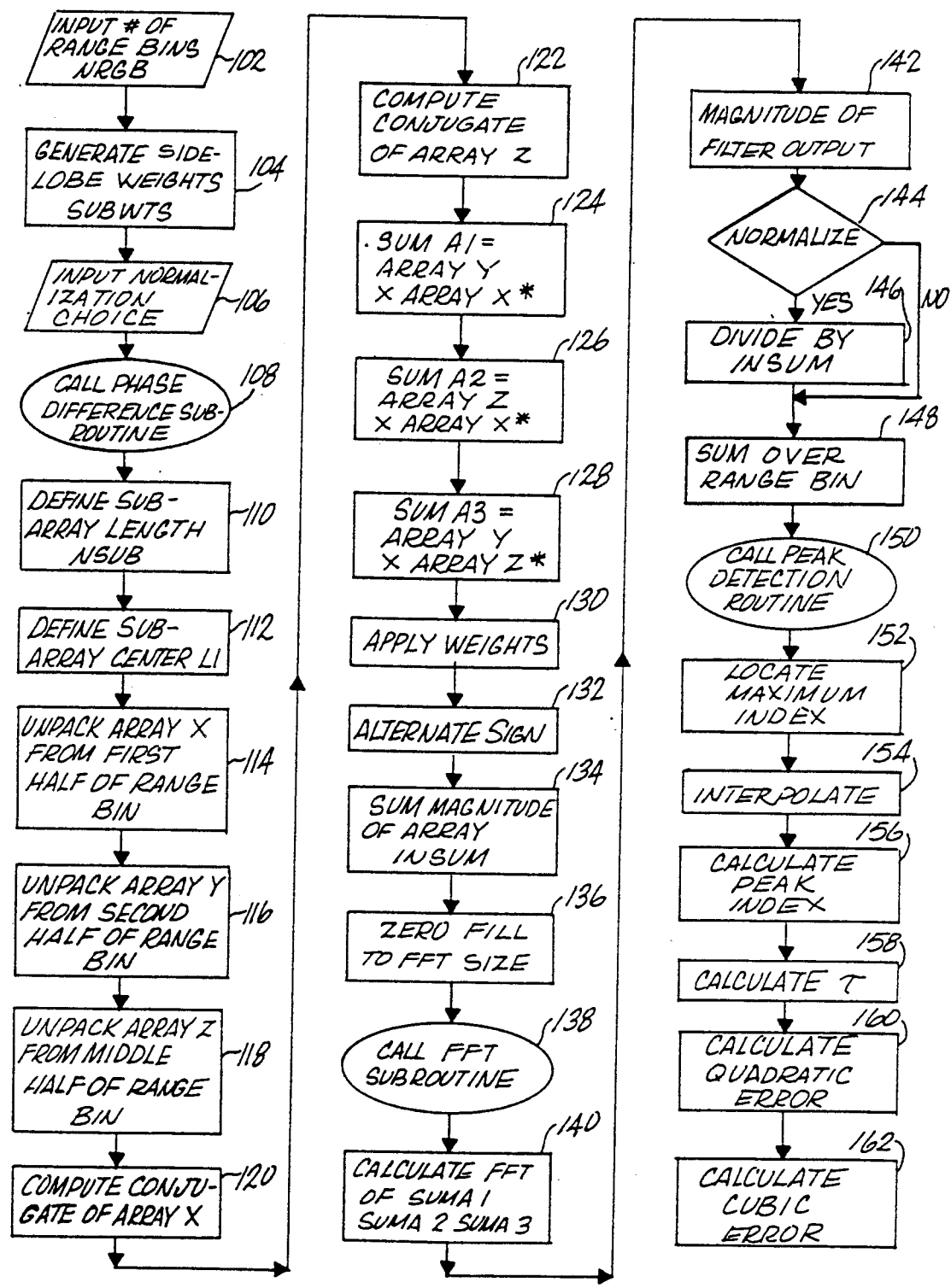
FIG. 5 is a logic flow chart providing a detailed representation of a computerized implementation of the elements of the invention.

The invention may be implemented in software for use in a computerized signal processing system such as a VAX 11/780 and an FPS 164 AP (Floating Point System array processor). FIG. 5 is a flow chart demonstrating such an implementation. In this example, 3 product arrays xy, xz and zy are formed and processed at the same time to compute $\tau_{xy}$, $\tau_{xz}$ and $\tau_{zy}$. Processing of 3 product arrays is shown here for an illustration purpose only. For the estimation of a quadratic phase error only, the preferred approach is to form just one product array xy and then obtain $\tau_{xy}$. For a simultaneous estimation of both quadratic and cubic phase errors, the preferred approach is to form two product arrays xz and zy, and then obtain $\tau_{xz}$ and $\tau_{zy}$. A number of range bins (nrgb) is input as shown in block 102. A set of sidelobe weights (subwts) is created in block 104 to suppress the sidelobes in the fast Fourier transform applied to the data. Those skilled in the art will recognize techniques for generation of such weights. A determination of whether to normalize the data is made in block 106. In the embodiment shown, a phase difference calculation subroutine is then called 108. A subarray length (nsub) is defined in block 110. As previously described, the subarrays chosen may or may not overlap. Typically, for simplicity the subarray length is chosen to be half of the number of azimuth lines or nazl/2. A subarray center L1 is defined in block 112. The data in each range bin is then processed.

The first array (array x) is "unpacked" from the range bin and comprises the data in the time samples from the first half of the range bin (time sample No. 1 through time sample nazl/2), as shown in block 114. The second array (array y) is then unpacked from the second half of the range bin (time samples (nazl/2)+1 through nazl) as shown in block 116. The third array (array z) is unpacked from the middle half of the range bin (time samples nazl/4 to 3 nazl/4) as shown in block 118. The complex conjugate of array x is then calculated in block 120 and the complex conjugate of array z is calculated in block 122. A first product array (suma1) is calculated by multiplying array y with the conjugate of array x as shown in block 124. A second product array (suma2) is calculated by multiplying array z with the conjugate of array x as shown in block 126. Finally, a third product array (suma3) is calculated by multiplying array y with the conjugate of array z as shown in block 128. The sidelobe weights generated in block 104 are applied to the product arrays as shown in block 130. Alternating sign is imposed on the array elements in block 132 and the magnitude of the array elements is integrated in variable in_sum as shown in block 134 for normalization use to be described subsequently. A zero fill is then added to expand the array size to match the FFT size as shown in block 136. Those skilled in the art will recognize that the calculations just described may be combined and programmed in the form of multiple nested loops.

An FFT subroutine is called 138 and the product arrays (suma1, suma2, and suma3) are operated on by the FFT and restored in the respective same array as shown block 140. The magnitude of the filter output is then determined to form a correlation function as shown in block 142 by calculating the absolute value of each element in the array. Normalization of the correlation function will be accomplished if selected. An option of the normalization choice entered in block 106 is accomplished in block 144. If a normalized correlation function is desired, each value in the correlation function is divided by the sum of magnitudes of the array from block 134 (in sum) as shown in block 148. The normalized or unnormalized correlation functions are integrated over the range bin by summing the absolute values calculated as shown in block 148.

The normalized or unnormalized output of the phase difference subroutine comprises correlation functions for the array pairs xy, xz or yz. The peak in each correlation function is then determined through a peak detection subroutine call 150. For each correlation function, a filter having the maximum correlation value is searched. Then, two adjacent filters are saved and a second order polynomial fit is performed to interpolate the correlation function in the neighborhood of those 3 consecutive filters. The location, $\tau$, of the maximum value in the interpolated correlation function is then obtained. The process is repeated for all 3 correlation functions.

The peak location $\tau$ is calculated as shown in box 158 in FIG. 5. The quadratic and cubic phase errors may then be calculated as shown in block 160 and 162 employing the equations for $\phi_q$ and $\phi_c$ as previously described.

A computer source program which encodes the steps previously discussed with respect to FIG. 5 follows. The main program is entitled "SUBROUTINE AUTOFOCUS". The phase difference subroutine called in block 108 of FIG. 5 is entitled "APROUTINE PH DIFF", and the peak detection subroutine called in block 150 of FIG. 5 is entitled "SUBROUTINE find_peak".

Having now described the invention in detail as required in the Patent Statutes, those skilled in the art will recognize modifications and substitutions in the elements of the invention to meet specific needs. Such modifications and substitutions are within the scope of the invention as defined in the following claims.

What is claimed is:

1. An apparatus for automatically focusing range compressed SAR data stored in an array of range bins and azimuth lines comprising:
   means for unpacking the range compressed data in each range bin;
   means for generating a first and second subarray from the unpacked data;
   means for conjugating the first subarray;
   means for multiplying the conjugated first subarray and the second subarray to create a first product array;
   means for performing a fast Fourier transform of the first product array to produce an FFT filter bank output;
   means for calculating the magnitude of the FFT filter to form a correlation function;
   means for integrating the correlation function over the range bins;

means for detecting a peak in the correlation function after integrating over range bins;

means for calculating a quadratic phase error responsive to the detected peak; and means for removing the calculated phase error from the range compressed data.

2. An apparatus as defined in claim 1 further comprising:

means for reducing sidelobe outputs from the FFT filter bank output; and means for centering the FFT filter bank.

3. An apparatus as described in claim 2 further comprising means for normalizing the correlation function by dividing each value of the correlation function by the sum of the magnitudes of the input data to the FFT.

4. An apparatus as described in claim 3 further comprising:

means for generating a third subarray;

means for calculating the complex conjugate of third subarray;

means for multiplying the complex conjugate of the first subarray and the third subarray to obtain a second product array;

means for multiplying the complex conjugate of the third subarray and the second subarray to obtain a third product array;

means for performing a fast Fourier transform on the second and the third product arrays to produce a second and a third filter bank output;

means for determining the magnitude of the second and the third filter bank output to form a second and a third correlation functions;

means for normalizing the correlation function by the sum of magnitudes of the input data to the FFT;

means for integrating the second and the third correlation functions over the range bins;

means for detecting a peak filter in the second and the third correlation functions after integrating over the range bins;

means for calculating a quadratic error estimate responsive to the peak detected in the second and third correlation function;

means for calculating a cubic error estimate responsive to the peak detected in the second and third correlation function; and means for correcting the range compressed data for both the quadratic and the cubic errors calculated.

5. A method for autofocusing a quadratic phase error from range compressed SAR data contained in an array of range bins and azimuth lines comprising the steps of:

creating a first subarray of the SAR data;

creating a second subarray of the SAR data;

calculating the complex conjugate of the first taking the product of the complex conjugate of the first subarray and the second subarray;

performing a fast Fourier transform on the product to produce an FFT filter bank;

detecting the magnitude of the FFT filters to form a correlation function;

integrating the correlation function over the range bins;

detecting a peak in the correlation function after integrating overall range bins;

calculating a quadratic phase error responsive to the detected peak; and correcting the range compressed data for the quadratic phase error calculated.

6. A method for autofocusing both a quadratic and a cubic phase errors as defined in claim 5 further comprising the steps of:

creating a third subarray of the SAR data;

calculating the complex conjugate of the third taking the product of the complex conjugate of the first subarray and the third subarray to form a second product array;

taking the product of the complex conjugate of the third subarray and the second subarray to form a third product array;

performing a fast Fourier transform on the second and the third product arrays to form a second and a third FFT filter bank;

detecting the magnitude of the second and the third FFT filters to form a second and a third correlation functions;

integrating the second and the third correlation functions over the range bins;

determining a peak in the second and in the third correlation functions after integrating over the range bins;

calculating both a quadratic and a cubic phase errors responsive to the second peak and third peak; and correcting the range compressed data for both the quadratic and the cubic phase errors.

7. A method for autofocusing a quadratic phase error as defined in claim 5 further comprising the step of normalizing the correlation function by dividing each FFT filter by the sum of magnitudes of the input data to the FFT after detecting the magnitude.

8. A method for autofocusing both a quadratic and a cubic phase errors as defined in claim 6 further comprising the step of normalizing the second and the third correlation functions by dividing each value of the correlation functions by the sum of magnitudes of the respective input data to the FFT after detecting the 9. An apparatus as described in claim 3 further comprising:

means for generating a third subarray, means for calculating the complex conjugate of the second subarray, means for multiplying the complex conjugate of the second subarray and the third subarray to obtain a second product array, means for performing a fast Fourier transform on the second product array to produce a second filter bank output, means for determining the magnitude of the second filter bank output to form a second correlation function, means for integrating the second correlation function over the range bins, means for detecting a peak in the second correlation function after integrating over the range bins, means for calculating a cubic error estimate responsive to the peak detected in the first correlation function and the peak detected in the second correlation function, and means for correcting the range compressed data for the cubic error calculated.

10. An apparatus as described in claim 9 further comprising means for normalizing the second correlation function by the sum of the magnitudes of the input data to the FFT.

* * * * *